United States Patent
Cory

(10) Patent No.: US 7,382,823 B1
(45) Date of Patent: Jun. 3, 2008

(54) CHANNEL BONDING CONTROL LOGIC ARCHITECTURE

(75) Inventor: Warren E. Cory, Redwood City, CA (US)

(73) Assignee: Xilinx, Inc., San Jose, CA (US)

( * ) Notice: Subject to any disclaimer, the term of this patent is extended or adjusted under 35 U.S.C. 154(b) by 785 days.

(21) Appl. No.: 10/082,490

(22) Filed: Feb. 22, 2002

(51) Int. Cl.
*H04B 1/38* (2006.01)

(52) U.S. Cl. ................................ 375/220; 375/354

(58) Field of Classification Search ............... 375/220, 375/286, 293, 354, 359, 364, 365, 366, 368, 375/372
See application file for complete search history.

(56) References Cited

U.S. PATENT DOCUMENTS

| | | | |
|---|---|---|---|
| 5,361,373 A | 11/1994 | Gilson | |
| 5,537,601 A | 7/1996 | Kimura et al. | |
| 5,652,904 A | 7/1997 | Trimberger | |
| 5,671,355 A | 9/1997 | Collins | |
| 5,752,035 A | 5/1998 | Trimberger | |
| 5,784,003 A * | 7/1998 | Dahlgren | 340/2.2 |
| 5,870,441 A * | 2/1999 | Cotton et al. | 375/354 |
| 5,970,254 A | 10/1999 | Cooke et al. | |
| 5,999,026 A * | 12/1999 | Vorenkamp et al. | 327/156 |
| 6,014,406 A * | 1/2000 | Shida et al. | 375/133 |
| 6,020,755 A | 2/2000 | Andrews et al. | |
| 6,096,091 A | 8/2000 | Hartmann | |
| 6,279,045 B1 | 8/2001 | Muthujumaraswathy et al. | |
| 6,282,627 B1 | 8/2001 | Wong et al. | |
| 6,343,207 B1 | 1/2002 | Hessel et al. | |
| 6,373,834 B1 * | 4/2002 | Lundh et al. | 370/350 |
| 6,477,200 B1 * | 11/2002 | Agazzi et al. | 375/233 |
| 6,526,462 B1 * | 2/2003 | Elabd | 710/242 |
| 6,570,492 B1 * | 5/2003 | Peratoner | 340/310.01 |
| 6,639,905 B1 * | 10/2003 | Muller et al. | 370/336 |
| 6,667,993 B1 * | 12/2003 | Lippett et al. | 370/509 |
| 6,804,246 B1 * | 10/2004 | Petersen et al. | 370/395.64 |
| 2001/0007577 A1 * | 7/2001 | Measor | 375/247 |
| 2002/0095635 A1 * | 7/2002 | Wager et al. | 714/746 |

(Continued)

FOREIGN PATENT DOCUMENTS

EP    0 996 262 A    4/2000

(Continued)

OTHER PUBLICATIONS

U.S. Appl. No. 10/090,250, filed Mar. 1, 2002, Menon et al.
Cary D. Snyder and Max Baron; "Xilinx's A-to-Z System Platform"; Cahners Microprocessor; The Insider's Guide to Microprocessor Hardware; Microdesign Resources; Feb. 6, 2001; pp. 1-5.

*Primary Examiner*—Chieh M. Fan
*Assistant Examiner*—Freshteh N Aghdam
(74) *Attorney, Agent, or Firm*—John J. King

(57) ABSTRACT

A design is used for coordinating channel bonding operations of a set of transceivers. The set include a master transceiver and a plurality of first level slave transceivers that perform channel bonding operations. Each first level transceiver is controlled by the master transceiver. The set also comprises a plurality of second level slave transceivers that perform channel bonding operations. Each second level transceiver is controlled by one of the plurality of first level transceivers. Any transceiver can be set as either a master, a first level slave or a second level slave. The design comprises a plurality of flip-flops and multiplexers, and is controlled by a MODE signal that determines the mode of operation of the design.

18 Claims, 5 Drawing Sheets

U.S. PATENT DOCUMENTS

| | | | |
|---|---|---|---|
| 2002/0126789 A1* | 9/2002 | Georges et al. | 375/377 |
| 2003/0076909 A1* | 4/2003 | Greenhill et al. | 375/354 |
| 2003/0169261 A1* | 9/2003 | Emberling et al. | 345/506 |
| 2004/0013105 A1* | 1/2004 | Ahmavaara et al. | 370/349 |

FOREIGN PATENT DOCUMENTS

| | | |
|---|---|---|
| WO | WO 97/36403 A | 10/1997 |

* cited by examiner

CHANNEL BONDING CONTROL LOGIC ARCHITECTURE

FIELD OF THE INVENTION

The present invention relates to data communication, and more specifically to a design for controlling multiple transceivers.

BACKGROUND OF THE INVENTION

As a result of improvement in processing technology, it is now possible to put millions of transistors in an integrated circuit. This increases the amount of processing power of the integrated circuit. However, the processing power may be wasted if there are insufficient input-output (I/O) resources to transfer data to and from the integrated circuit. High speed I/O transceivers alleviate this problem by increasing the data transfer speed of the I/O resources.

One way to increase the speed of I/O is to build better circuits (e.g., phase detector, charge pumps, filters, oscillators, etc.). Another way is to use multiple transceivers working in parallel. For example, data words in a transmitter can be split into bytes, with each byte sent over a separate transceiver. The bytes are received in parallel by separate transceivers in a receiver. The received bytes are then combined in the correct sequence to recover the original words. In the present invention, the communication path of each transceiver pair (one in the transmitter and one in the receiver) is called a "channel".

One of the problems of communication using parallel channels is that the data words may not be aligned properly when they reach the receiver. FIG. 1 is a drawing showing such as a situation. It shows four parallel buffers 112a-115a of a transmitter 102. Each buffer handles one byte of a four-byte word. For example, in order to transmit a full word contains bytes "SSSS", the first "S" is handled by the first buffer, the second "S" is handled by the second buffer, etc. The arrows on top of the buffers indicate a transmission clock. FIG. 1 also shows the buffers of a receiver 104 that does not perform alignment. The arrows on top of the buffers indicate the sampling clock. It shows that the second buffer, 113b, is not aligned with the other buffers. One of the causes of the misalignment is variations in transmission delay, especially if the data streams are routed through repeaters. In this case, the received word will have the form "STSS", which is not the same as the transmitted word. FIG. 1 also shows the buffers of a receiver 106 that is able to perform alignment. It shows that the sampling clock is able to properly associate with the correct data, and the correct word can be recovered. This alignment process is also called "channel bonding."

One way to support correction of misalignment is to include in the data stream special byte sequences that define corresponding points in the several buffers. As illustration, it is assumed in FIG. 1 that the "P" bytes are special characters for this purpose. Each receiving transceiver recognizes the "P" character and remembers its location in the buffer. One transceiver will be designated as the master that instructs all the slave transceivers to align to the channel bonding character "P" (or to some location relative to the channel bonding character). After this operation, the words will be properly aligned: RRRR, SSSS, TTTT, etc.

A transceiver may also perform other operations, such as clock correction. These collective operations are commonly called "elastic buffer" operations.

It can be seen from above that channel bonding is an important tool for increasing the speed of a communication system. Consequently, it is desirable to improve the operation of channel bonding.

SUMMARY OF THE INVENTION

The present invention involves a system for coordinating channel bonding operations of a plurality of transceivers. It comprises a master transceiver and a plurality of first level transceivers that perform channel bonding operations. Each first level transceiver is controlled by the master transceiver. The system also comprises a plurality of second level transceivers that perform channel bonding operations. Each second level transceiver is controlled by one of the plurality of first level transceivers.

One way to achieve the above coordination is to include a controller in the transceivers. This controller generates a first output control signal in response to a first and a second input signals. This output signal is used to control channel bonding operations. It comprises a first flip-flop that accepts the first input signal (the "master" signal) and generate an output signal. It also comprises a first multiplexer that has an output terminal and at least a first and a second input terminal. The first input terminal accepts the output signal of the first flip-flop, and the second input terminal is connected to the second input signal (the "channel bonding" input signal). The controller contains a second flip-flop that has an output terminal and an input terminal. The input terminal of the second flip-flop is connected to the output terminal of the first multiplexer. A second multiplexer having an output terminal and at least a first and a second input terminal is included in the controller. The first input terminal of the second multiplexer is connected to the output terminal of the second flip-flop, and the second input terminal is connected to the second input signal. The controller comprises a third flip-flop that has an output terminal to deliver the first output control signal. The input terminal of the third flip-flop is connected to the output terminal of the second multiplexer. A mode signal is used to select one of the two input terminals of the two multiplexers.

In a further embodiment of the controller, it delivers a second output control signal (the "channel bonding" output signal). In this embodiment, the controller contains a third multiplexer that has at least a first and a second input terminals. The first input terminal is connected to the first input signal. The second input terminal is connected to the second input signal. The output terminal is connected to the input of a fourth flip-flop. The output of the fourth flip-flop delivers the second output control signal.

The above summary of the invention is not intended to describe each disclosed embodiment of the present invention. The figures and detailed description that follow provide additional exemplary embodiments and aspects of the present invention.

DETAILED DESCRIPTION OF THE INVENTION

Figure 1:
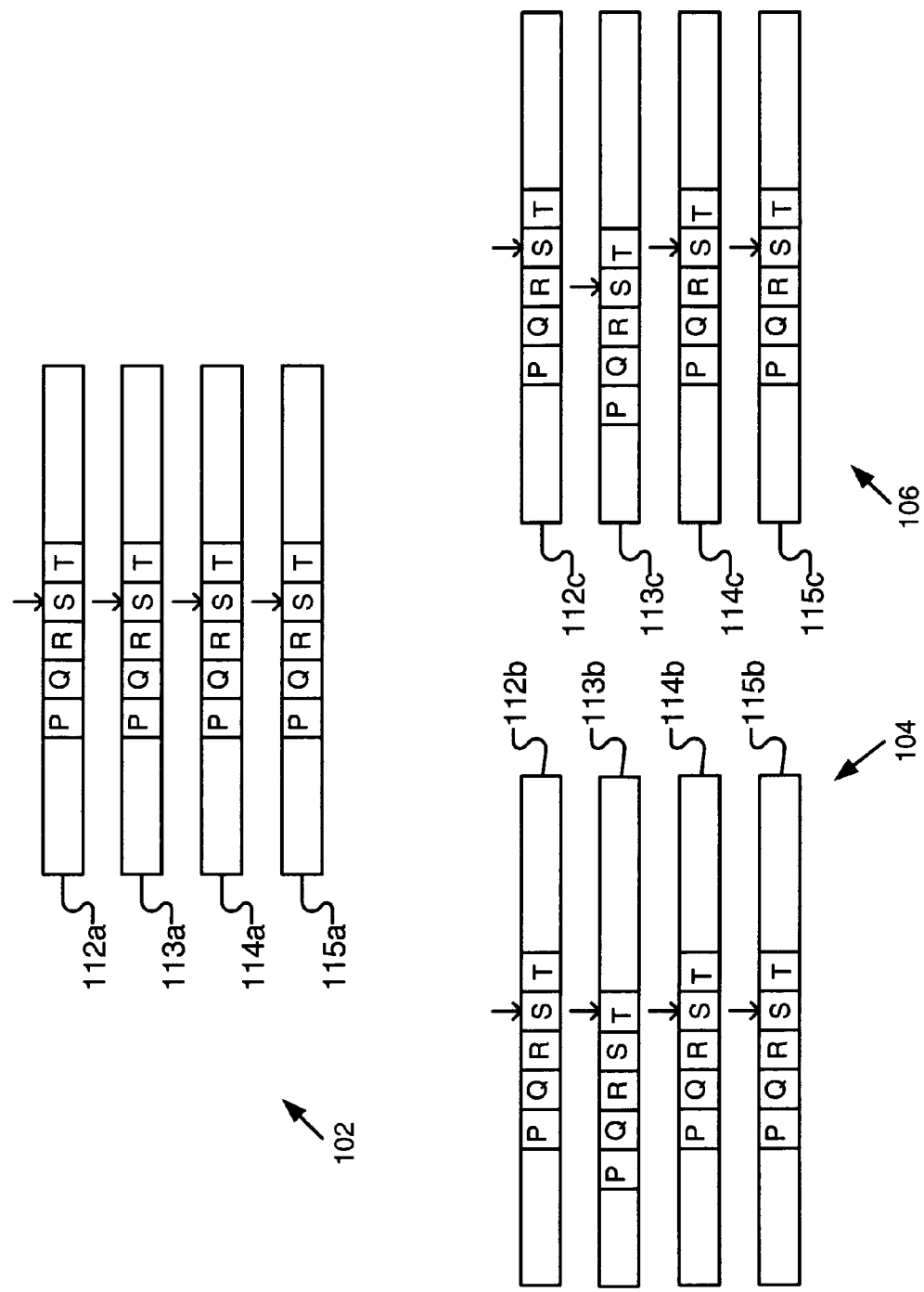
FIG. 1 is a diagram showing the operation of channel bonding.
Figure 2:
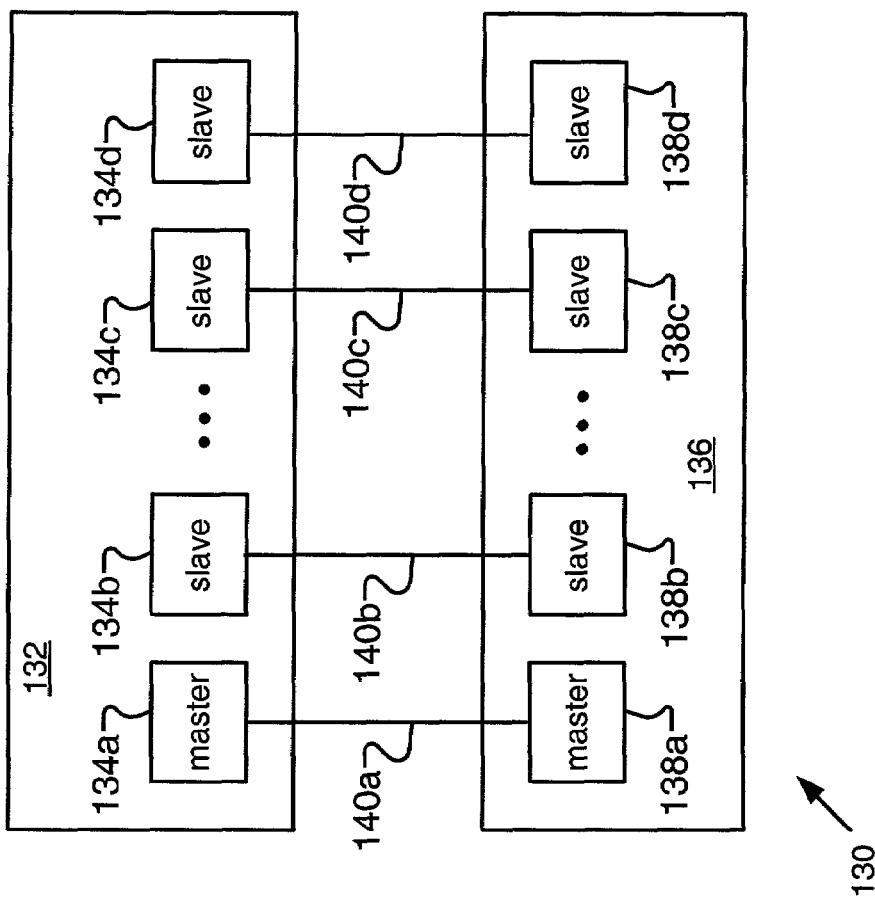
FIG. 2 is a diagram of a communication system of the present invention.

A communication system 130 of the present invention is shown in FIG. 2. It contains a first device 132 having a plurality of transceivers 134*a*-134*d*. One of the transceivers, such as transceiver 134*a*, is designated as the master. System 130 also contains a second device 136 having a plurality of transceivers 138*a*-138*d*. One of the transceivers, such as transceiver 138*a*, is designated as the master. Each transceiver in first device 132 is connected to the corresponding transceiver in second device 136 to form a channel. It should be noted that the master transceivers in the first and the second devices are not necessarily connected to one another.

When multiple transceivers operate in parallel as described above, the master transceiver controls channel bonding and clock correction operations in the slaves via control signal(s) connecting the several transceivers. One aspect of the invention is a method for the distribution of these control signals. The method allows an arbitrary group of transceivers to be channel bonded, provided the control signal routing between transceivers meets timing constraints.

Figure 3:
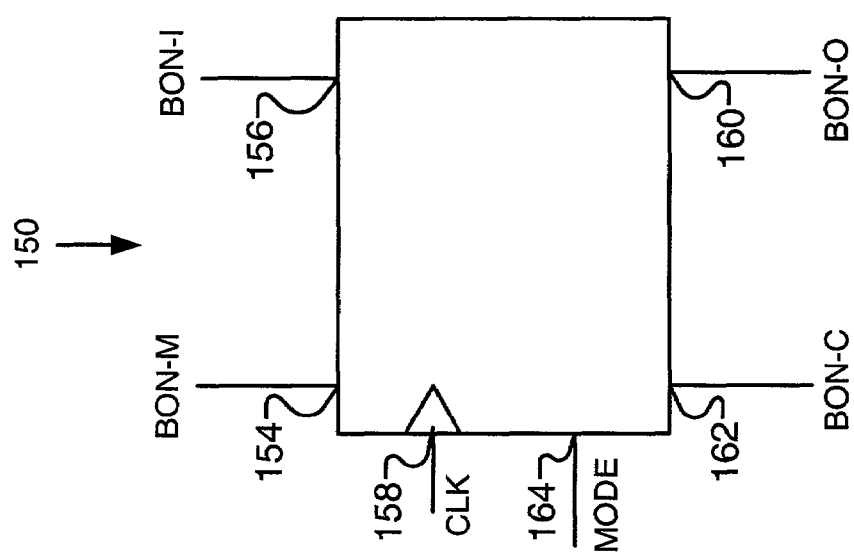
FIG. 3 is a block diagram of the input-output interface of a controller of the present invention.
Figure 5:
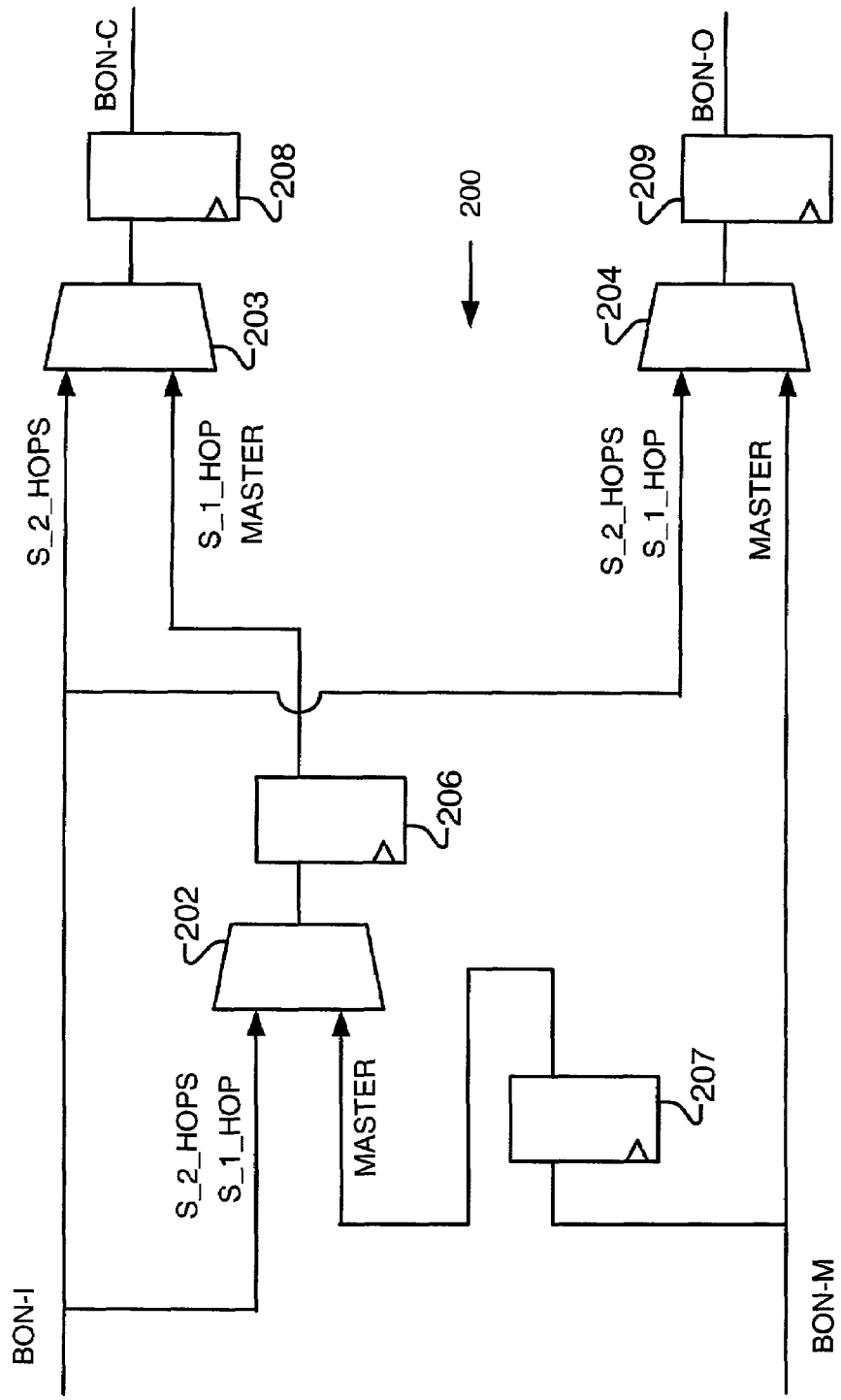
FIG. 5 is a block diagram of a portion of a controller of a transceiver of the present invention.

FIG. 3 is a block diagram showing the input-output interface of a control section 150 of a transceiver of the present invention. Control section 150 contains the following input ports:

(a) a port 154 for accepting a control signal BON-M generated when this transceiver is designated a master;

(b) a port 156 for receiving a control signal BON-I from another transceiver when this transceiver is designated a slave; and (c) a port 158 for receiving a clock signal CLK that is used to drive all the flip-flops in control section 150 (see FIG. 5 for more details).

The signal BON-M is preferably generated internally by the transceiver and delivered to control section 150.

Control section 150 also contains the following output ports:

(a) a port 160 for delivering a control signal BON-O to another transceiver; and (b) a port 162 for delivering a control signal BON-C to the current transceiver for performing elastic buffer operations.

Control section 150 also contains a port 164 to accept a signal MODE. This signal identifies the mode of operation of the transceivers and is used to set the multiplexers in control section 150 (see FIG. 5 for details). In one embodiment, the modes are:

(a) OFF: The transceiver is not channel bonded with other transceivers.
(b) MASTER: The transceiver is a master.
(c) S_1_HOP: The transceiver is a slave that is controlled by a master transceiver.
(d) S_2_HOPS: The transceiver is a slave that is controlled by a S_1_HOP transceiver.

Figure 4:
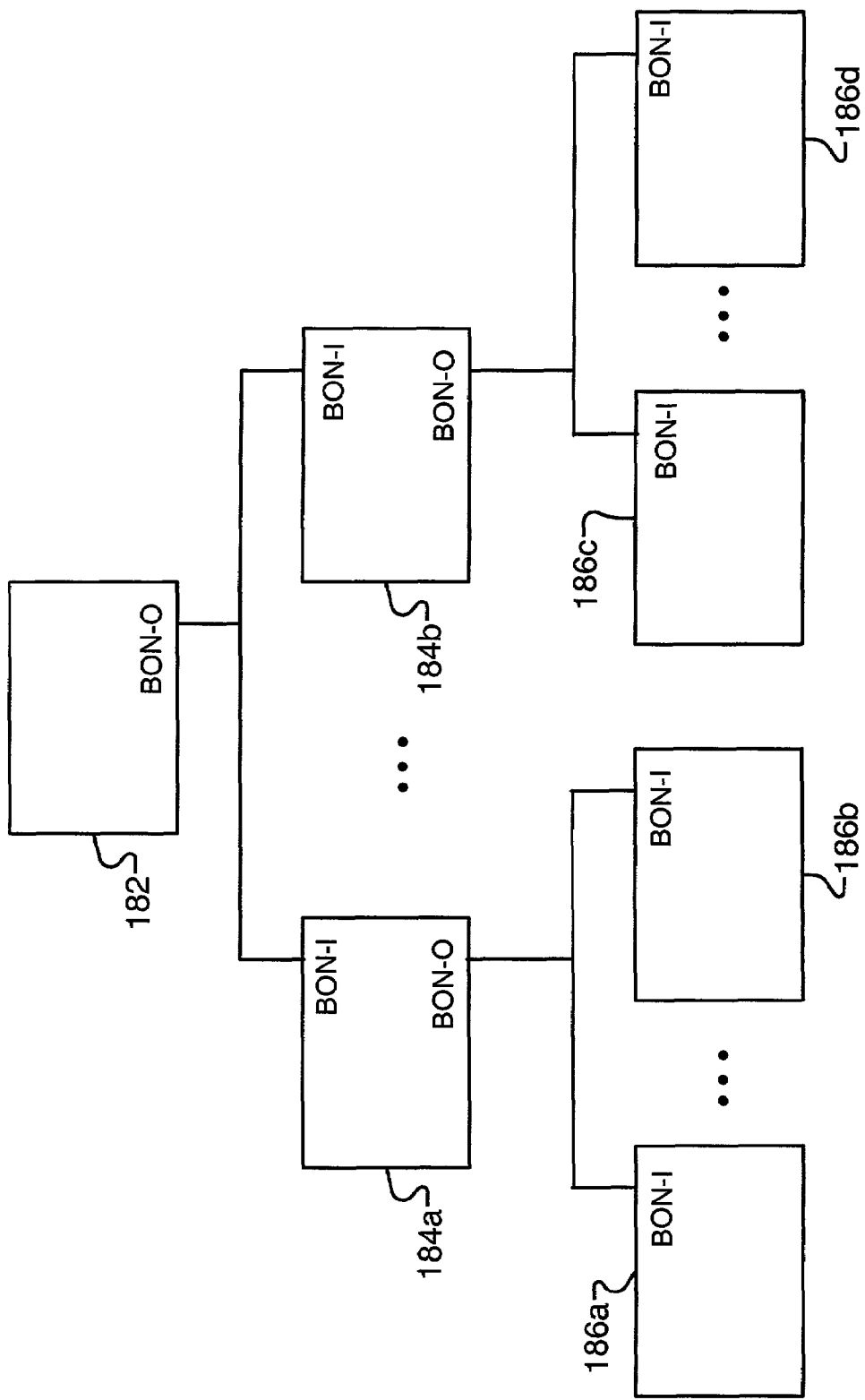
FIG. 4 is a schematic diagram showing the connection of a plurality of transceivers of the present invention.

FIG. 4 is a schematic diagram showing the connection of different transceivers in accordance with the present invention. It shows a master transceiver 182 controlling a plurality of slave transceivers 184*a* and 184*b*. The BON-O control signal of the output port of master transceiver 182 is connected to the BON-I input port of the slave transceivers. Each slave transceiver controls a plurality of second level slave transceivers. For example, slave transceiver 184*a* controls transceivers 186*a* and 186*b*, while slave transceiver 184*b* controls transceivers 186*c* and 186*d*. The BON-O control signal of the output port of each slave transceivers is connected to the BON-I input port of the corresponding second level slave transceivers.

It should be noted that more levels of slave transceivers can be handled using the principle of the present invention.

FIG. 5 is a block diagram of a portion 200 of the control section of a transceiver of the present invention. This portion accepts the input signals BON-I and BON-M, and then generates the output signals BON-C and BON-O. Portion 200 contains three multiplexers 202-204 and four flip-flops 206-209. The flip-flops are clocked by the same clock signal CLK received by the control section. The multiplexers are controlled by the same MODE signal received by the control section. Each multiplexer selects one of two input signals as output. The selection is determined by the MODE signal. For example, when the MODE signal is set at S_1_HOP or S_2_HOPS, the first input terminal of multiplexer 202 is selected while when MODE signal is set at MASTER, the second input terminal of multiplexer 202 is selected. It should be noted that FIG. 5 only shows a design that is used to process one bit of a multi-bit signal. Thus, portion 200 needs to be duplicated for a multi-bit system. For example, if the control and output signals are four-bit wide, each transceiver should have four copies of portion 200.

One characteristic of the present invention is that the number of flip-flop stages from the masters BON-M signal to any transceiver's BON-C signal (in the master and first and second level slaves) is the same. In this embodiment, the number of flip-flops is three. This will be illustrated in FIG. 6. This arrangement ensures that elastic buffer operations specified by the master will occur simultaneously in all the bonded transceivers.

Figure 6:
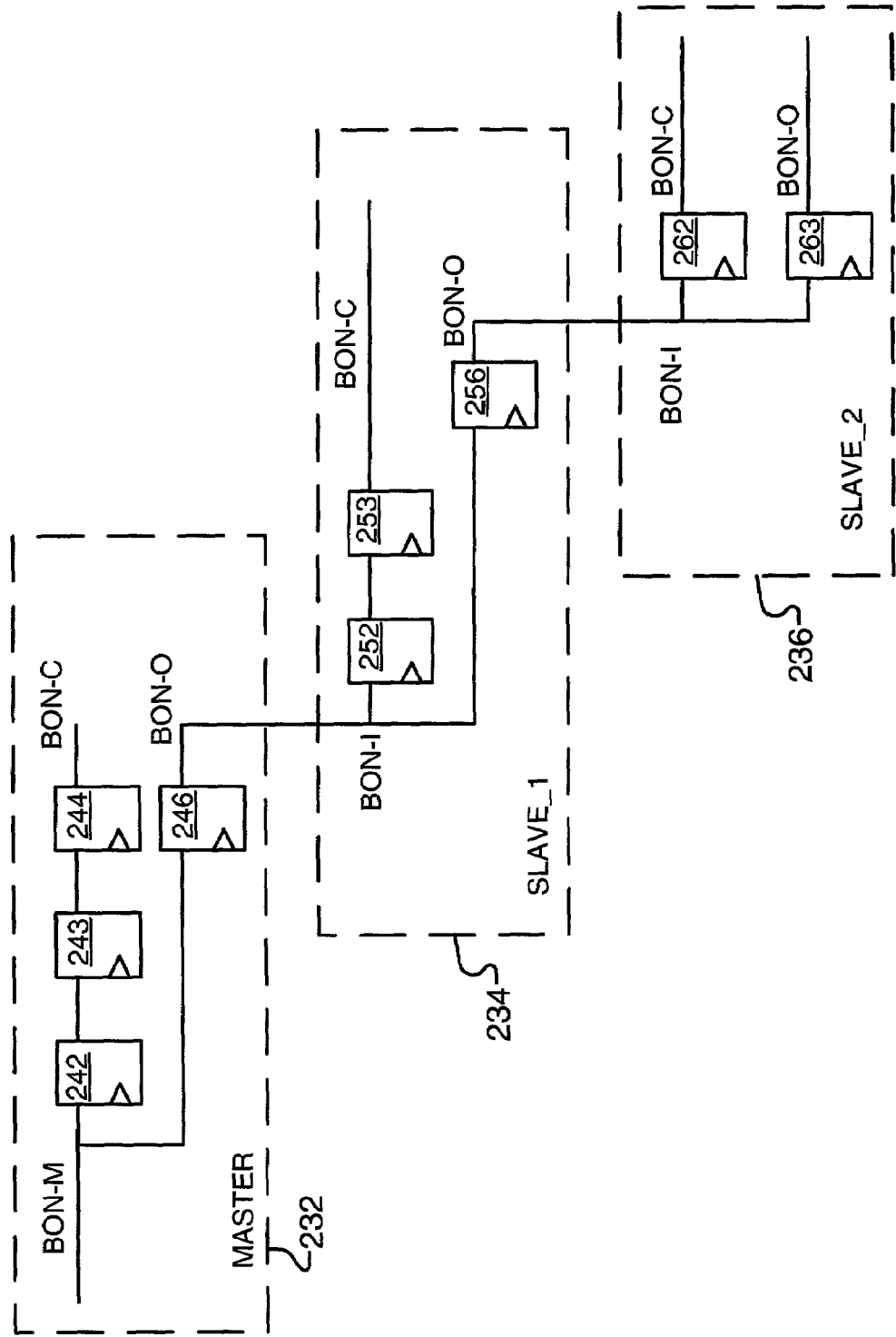
FIG. 6 is a diagram showing the equivalent circuit of a master transceiver and two slave transceivers.

FIG. 6 is a diagram showing the equivalent circuit of three transceivers: one master 232, one first level slave 234, and one second level slave 236. In master transceiver 232, there are three flip-flops 242-244 between signal BON-M to signal BON-C and one flip-flop 246 between signal BON-M and BON-O. Referring to FIG. 5, this is the situation where the MODE signal selects the bottom inputs of the multiplexers 202-204.

In the first level slave transceiver 234, there are two flip-flops 252-253 between signal BON-I and signal BON-C. Referring to FIG. 5, this is the situation where the MODE signal selects the middle inputs of multiplexers 202-204. Together with flip-flop 246, there are three flip-flops from signal BON-M to BON-C of transceiver 234.

In the second level slave transceivers 236, there is one flip-flop 262 between signal BON-I and signal BON-C. Referring to FIG. 5, this is the situation where the MODE signal selects the top inputs of multiplexers 202-204. Together with flip-flops 246 and 256, there are three flip-flops from signal BON-M to BON-C of transceiver 236.

One advantage of the present invention is that the channel bonding control signals are not required to propagate from the master to all the slaves in a single clock cycle. The control signals need propagate only to the first level slaves in one clock cycle, and then use an additional clock cycle to propagate thence to the second level slaves. This increases the permissible control signal propagation delay between the master and the most remotely located slave transceivers. The invention also incurs minimal propagation delay for BON-I and BON-O inside the transceiver: BON-O comes directly from a flip-flop, and BON-I has only a single multiplexer delay before reaching any flip-flop. This further increases the propagation delay that may be allocated to control signal routing between the transceivers.

Another advantage of the present invention is that any transceiver may be designated as a master or a slave by the setting of the MODE signals. For a given collection of transceivers, any subset could be channel bonded by appropriate setting of the MODE signals and corresponding interconnection of BON-O and BON-I control signals for the transceivers in the subset. It is even possible to create multiple, disjoint subsets of channel-bonded transceivers within the given collection.

These advantages are particularly attractive for transceivers associated with a field-programmable gate array ("FPGA"). In this environment, transceivers may be widely separated, so that propagation delay of channel bonding control signals between transceivers is a significant problem. Also, the FPGA's programmable routing resources may be used for the channel bonding control signals, facilitating the creation of arbitrarily defined subsets of transceivers that are channel bonded. This capability is desirable in FPGAs, which are intended to be easily configurable for a broad variety of applications.

These advantages may be attractive in other environments as well, for example, for channel bonding transceivers across multiple integrated circuit chips.

In order to properly carry out the operation of the present invention, the elastic buffer control signals (BON-C) are preferably computed three clock cycles before they are used. This implies that the master's elastic buffer control logic, including any necessary FIFO address generation, is operating in a "lookahead" fashion to generate BON-M in a timely way.

Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

The invention claimed is:

1. A system for coordinating channel bonding operations of a plurality of transceivers of an integrated circuit, comprising:
   a master transceiver of the integrated circuit that performs channel bonding operations for aligning different portions of a data stream transmitted in parallel by way of a plurality of data channels;
   a plurality of first level transceivers of the integrated circuit that perform channel bonding operations, each first level transceivers being controlled by the master transceiver and receiving a control signal by way of a first configurable path, wherein the first configurable path is configured according to a first mode signal for a first level transceiver, the first mode signal determining a delay of the control signal received by way of the first configurable path; and
   a plurality of second level transceivers of the integrated circuit that perform channel bonding operations, each second level transceiver being controlled by one of the plurality of first level transceivers and receiving a control signal by way of a second configurable path, wherein the second configurable path is configured according to a second mode signal for a second level transceiver, the second mode signal determining a delay of the control signal received by way of the second configurable path;
   wherein each transceiver comprises a controller receiving a mode control signal designating the transceiver as a master transceiver or a slave transceiver and enabling a control signal to be applied to the transceiver by way of a configurable path during a predetermined clock cycle to enable channel bonding operations for aligning the different portions of the data stream transmitted in parallel.

2. The system of claim 1 further comprising a clock signal, and wherein the master transceiver and the plurality of first level transceivers generate respective control signals at different cycles of the clock signal.

3. The system of claim 1 wherein each of the plurality of transceivers contains at least one buffer for the channel bonding operations.

4. An apparatus that generates an output signal in response to a first input signal and a second input signal comprising control signals for aligning data, the apparatus comprising:
   a first flip-flop that accepts the first input signal and generate an output signal;
   a first multiplexer having an output terminal and at least a first and a second input terminal, the first input terminal accepting the output signal of the first flip-flop, and the second input terminal being connected to the second input signal;
   a second flip-flop having an output terminal and an input terminal that connects with the output terminal of the first multiplexer;
   a second multiplexer having an output terminal and at least a first and a second input terminal, the first input terminal being connected to the output terminal of the second flip-flop, and the second input terminal being connected to the second input signal; and
   a third flip-flop having an output terminal and an input terminal, the input terminal being connected to the output terminal of the second multiplexer.

5. The apparatus of claim 4 further comprising:
   a third multiplexer having an output terminal and at least a first and a second input terminal, the first input terminal being connected to the first input signal, the second input terminal being connected to the second input signal; and
   a fourth flip-flop having an output terminal and an input terminal, the input terminal being connected to the output terminal of the third multiplexer.

6. A communication system comprising:
   a first device having a plurality of transceivers; and
   a second device having a plurality of transceivers;
   wherein the plurality of transceivers in the first device is connected to the plurality of transceivers in the second device which receives control signals for aligning data received from the first device; and
   each of the transceivers comprises:
      a buffer,
      a first flip-flop that accepts a first input signal and generate an output signal;
      a first multiplexer having an output terminal and at least a first and a second input terminal, the first input terminal accepting the output signal of the first flip-flop, and the second input terminal being connected to a second input signal;
      a second flip-flop having an output terminal and an input terminal that connects with the output terminal of the first multiplexer;

a second multiplexer having an output terminal and at least a first and a second input terminal, the first input terminal being connected to the output terminal of the second flip-flop, and the second input terminal being connected to the second input signal; and a third flip-flop having an output terminal to control the buffer and an input terminal, the input terminal being connected to the output terminal of the second multiplexer.

7. The system of claim 6 wherein each of the transceivers further comprises:

a third multiplexer having an output terminal and at least a first and a second input terminal, the first input terminal being connected to the first input signal, the second input terminal being connected to the second input signal; and a fourth flip-flop having an output terminal and an input terminal, the input terminal being connected to the output terminal of the third multiplexer.

8. The system of claim 1 wherein the system for coordinating channel bonding operations of a plurality of transceivers comprises a system for aligning bytes of a word.

9. The system of claim 1 wherein said transceivers comprise a plurality of levels, where each slave transceiver comprises an input to receive a control signal from a previous level.

10. The system of claim 9 wherein each slave transceiver is configured by mode control signal to receive a control signal from either a master transceiver or a slave transceiver.

11. The apparatus of claim 4 wherein the first input signal comprises a master input signal.

12. The apparatus of claim 4 wherein the second input signal comprises a control signal from a previous stage.

13. The apparatus of claim 4 wherein the output of said second multiplexer of a transceiver comprises a control signal for the transceiver.

14. The apparatus of claim 5 wherein the output of the fourth flip-flop of a transceiver comprises a control signal coupled to another transceiver.

15. The system of claim 6 wherein the communication system comprises N levels of devices having a plurality of transceivers.

16. The system of claim 15 wherein a path from an input of a control circuit of a master transceiver to an output of the control circuit generating a control signal coupled to the master transceiver comprises N flip flops.

17. The system of claim 16 wherein each level of transceivers following the master transceiver comprises N-X flip flops where X comprises the number of stages after the master transceiver.

18. The system of claim 17 wherein the communication system comprises a field programmable gate array.

* * * * *